United States Patent Office 3,299,067
Patented Jan. 17, 1967

3,299,067
2-[1'-(BENZYL AND PHENYL)-4'-PIPERAZINYL]-PYRIMIDINE DERIVATIVES
Gilbert Regnier, Sceaux, Roger Canevari, La Haye-les Roses, and Michel Laubie, Vaucresson, France, assignors to Science Union et Cie, Societe Francaise de Recherche Medicale, Suresnes, France, a French society
No Drawing. Filed Nov. 12, 1964, Ser. No. 410,771
Claims priority, application Great Britain, Nov. 19, 1963, 45,685/63
9 Claims. (Cl. 260—256.4)

The present invention provides new pyrimidine derivatives of the general Formula I:

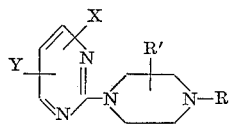

in which: (a) R represents
(1) a benzyl radical of the general Formula II

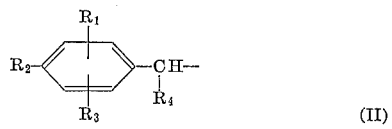

in which $R_1$, $R_2$ and $R_3$ each represent a hydrogen atom, a hydroxyl group, a lower alkoxy group containing up to and including 5 carbon atoms, or a lower-alkanoyloxy group, e.g. a propionoxy or an acetoxy group $CH_3COO$; or any two of them may together represent an alkylene dioxy chain, —O—$(CH_2)_n$—O—, in which $n$ is the integer 1 or 2; and $R_4$ represents a hydrogen atom, a lower alkyl group of up to and including five carbon atoms or a benzene ring which may be substituted by one or more of the groups $R_1$, $R_2$, $R_3$ as defined above; or
(2) a benzene nucleus mono-substituted in the 2-, 3- or 4-position or di-substituted in the 2:3, or 3:4 or 2:5-position, by a halogen atom as, for example, fluorine, chlorine or bromine, or a lower alkyl or lower alkoxy radical containing up to and including 5 carbon atoms, a trifluoromethyl radical ($CF_3$) or a hydroxyl group (b) R' represents a hydrogen atom or a methyl group; and (c) X and Y each represent a hydrogen atom, a lower alkyl or a lower alkoxy group containing up to and including 5 carbon atoms, a hydroxyl group or an amino radical —NR"R'" in which R" and R'" represent a hydrogen atom, a lower alkyl radical of up to five carbon atoms inclusive or a hydroxylower-alkyl, e.g., hydroxypropyl or hydroxyl ethyl group, and pharmaceutically acceptable acid addition salts thereof.

The new compounds can be prepared by condensation of a halogenated derivative of a pyrimidine of the general Formula III:

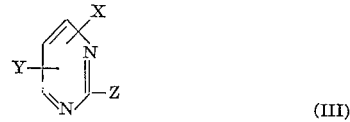

in which X and Y have the meanings given above and Z represents a chlorine or bromine atom, with a N-mono-substituted piperazine of the general Formula IV:

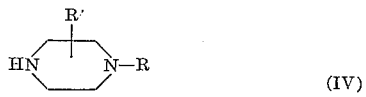

in which R and R' have the meanings given above.

They can also be prepared by condensation of a pyrimidine of the general Formula V:

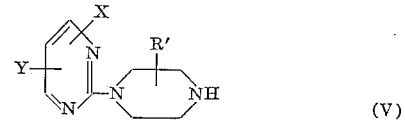

in which R', X and Y have the meanings given above, with a compound of the general formula R—Z, in which R has the meaning given in (a) (1) above and Z represents a chlorine or bromine atom.

The above processes are advantageously carried out by reacting one or the other of the halogenated compounds referred to in the foregoing paragraphs with a suitable N-mono-substituted piperazine, in solution in a polar solvent chosen from among the alcohols having a high boiling point, such, for example, as butanol, pentanol, or better in an aromatic liquid amide such as dimethylformamide or dimethylacetamide, or in a non-polar solvent chosen from among the aromatic hydrocarbons such, for example, as toluene or xylene. It is advantageous to operate at the temperature of about 110 to 140° C., in the presence of an acceptor of the hydracid formed in the course of the reaction. The latter may be chosen from among the alkali metal salts or alkaline-earth metal salts of carbonic acid such, for example, as sodium or potassium bi-carbonate and carbonate, and calcium carbonate, or from among the tertiary organic bases such, for example, as dimethylamine, pyridine or triethylamine; if desired, it is also possible to replace such salts or such tertiary bases by an excess of the mono-substituted piperazine selected.

It is moreover advantageous for the obtention of derivatives of the above general formula in which at least one of the substituents X, Y or $R_1$, $R_2$, $R_3$ represents a hydroxyl group, to undertake the condensation, instead of on the halogenated phenol derivatives above defined, on the halogenated derivatives in which one of X and Y represents a benzyloxy group and one of $R_1$, $R_2$, $R_3$ an alkanoyl, e.g., acetoxy group, as indicated in the general formula. The product of the condensation is thereafter subjected to a hydrolysis by a strong acid or base or to hydrogenolysis in the presence of a catalyst such as palladium on carbon following the methods currently used to free a phenol function from its "protecting groups."

A process adapted for preparing compounds in which R represents a benzyl radical substituted with at least one hydroxyl group, consists in reacting a benzaldehyde of general Formula VI:

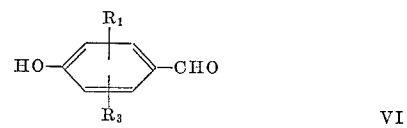

in which $R_1$ and $R_3$ are as defined in (a) (1), with a pyrimidine of Formula V as above and at the same time subjecting the intermediate product, without isolation, to a reduction by hydrogen in the presence of an appropriate catalyst.

The advantage of such a method is that one may obtain directly the derivatives of the pyrimidines having at least one phenol group without having to use protecting groups previously defined such as benzyl or acetyl.

This process may be carried out by dissolving a substituted pyrimidyl piperazine in an alcohol having a low molecular weight such as methanol, ethanol or isopropanol with a benzaldehyde as above defined in a slight excess and subjecting the mixture, so obtained, to a hydrogenation under a pressure of 1 to 20 atmospheres in the presence of a catalyst such as platinumoxide or palladium on carbon at a temperature of about 20 to 70° C.

The new pyrimidine derivatives obtained in this way, which are weak bases, can be converted into addition salts with acids and, in this respect, form part of the invention. These addition salts can be obtained by the reaction of the new derivatives on acids in suitable solvents such, for example, as water or water-miscible alcohols. As acids used for the formation of these addition salts there may be mentioned, in the mineral series: hydrochloric, hydrobromic, methanesulphonic, sulphuric and phosphoric acid; in the organic series acetic, propionic, maleic, fumaric, tartaric, citric, oxalic, benzoic acid, etc.

If necessary, these new derivatives can be purified by physical methods such as distillation, crystallisation or chromatography, or chemical methods such as formation of the addition salts defined above, crystallisation of the latter and decomposition by means of alkaline agents.

The new pyrimidine derivatives of the invention and their addition salts possess valuable pharmacological and therapeutical properties and may be used as medicaments, in particular as peripherical vasodilators, analgesics and anti-inflammatory agents.

Their toxicity is low and the $LD_{50}$ is from 150 to 829 mg./kg. in mice intraperitoneally.

The vasodilator activity was studied in the dog. It was found that the new derivatives, when administered intravenously at does of 0.5 to 5 mg./kg., increase the femoral output from about 50 to 100%. The vasodilation is effective even 60 minutes after the injection. When administered orally at a dose of 0.5 to 5 mg./kg., the derivatives have the same peripheral vasodilator effect.

They possess also antiinflammatory properties as demonstrated on the plantar oedema of the rat's paw induced by subaponeurotic injection of kaolin. Compounds of the invention inhibit inflammation sometimes more than 40% in comparison with those untreated, when administered orally at a total dose of 400 mg./kg. over a period of 3 days.

The analgesic activity is demonstrated by the hot plate test of Woolf and Mac-Donald. It was found that when the compounds were administered intraperitoneally in mice at a dose of 50 to 100 mg./kg., the threshold of pain perception of animals increased from 50 to 100% in comparison with those untreated.

The compounds may be used as medicaments and may be administered to a living animal body in the form of pharmaceutical preparations containing the compounds in admixture or conjuction with a pharmaceutical organic or inorganic solid or liquid carrier suitable for oral, rectal or parenteral administration. They are usually advantageously employed in the form of their pharmaceutically acceptable acid addition salts.

For making up the preparations there may be employed substances which do not react with the new compounds, such as water, lactose, starches, talc, magnesium stereate, glucose, arabic gum, cellulose or other known carriers.

The pharmaceutical preparations may be in solid form, for example as tablets, dragees, capsules or suppositories, or in liquid form as solutions, suspensions or emulsions. The doses can vary from about 5 to about 50 mg.

The compound 2-[1'(3":4"-methylenedioxy benzyl)-4'-piperazinyl]-pyrimidine was administered orally to human patients suffering from arteritis at the dose of 15 to 30 mg. daily during 15 to 45 days. A pronounced improvement of the circulation was observed, in particular expressed by the increase of oscillation-index and disappearance of intermittent claudication. The drug was perfectly tolerated and no side effect was observed.

The following examples illustrate the invention:

The melting points were determined by the Kofler method under microscope.

EXAMPLE 1

2-[1'-(3":4"-methylenedioxy benzyl)-4-piperazinyl]-pyrimidine

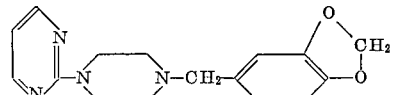

To a solution of 21 grams of 1-(3':4'-methylenedioxy benzyl)-piperazine in solution in 300 cc. of anhydrous xylene there were added 28 grams of anhydrous potassium carbonate and then 11.3 grams of 2-chloropyrimidine. The suspension was then heated for 9 hours at boiling point (130° C.). After this time, the mixture was cooled and extracted several times with 10% hydrochloric acid. The acid solution obtained was washed with ether and then rendered alkaline with potassium carbonate; the oily product which was separated was extracted with chloroform and this, after drying with potassium carbonate and evaporation, gave an oily residue weighing 20 grams. By dissolution in boiling ethanol and crystallisation, 15 grams of crystals melting at 96° C. were recovered.

EXAMPLE 2

By using the same method as in Example 1 starting with 16.4 grams of 2-(1'-piperazinyl)-pyrimidine in solution in 300 cc. of xylene, 28 grams of potassium carbonate and 18 grams of (3':4'-methylenedioxy benzyl)-chloride, 16 grams of crystals melting at 96° C. were finally obtained.

The starting piperazinyl pyrimidine was prepared by the method of Howard and Coll., J. Org. Chem. (1953) 18, 1484–1488.

EXAMPLE 3

2-[1'-3":4"'-ethylenedioxy benzyl)-4'-piperazinyl]-pyrimidine

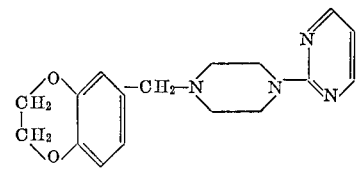

prepared as in Example 1 from 1-(3':4'-ethylenedioxy benzyl)-piperazine and 2-chloro pyridine in xylene at reflux. The corresponding dihydrochloride melts at 220–226° C. (with decomposition).

EXAMPLE 4

2-[(1'-benzhydryl)-4'-piperazinyl)]-pyrimidine

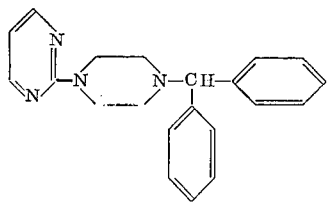

prepared as in Example 1 from 1-benzhydryl piperazine and 2-chloro pyrimidine in xylene at reflux. The base melts at 170° C.

EXAMPLE 5

2-[1'(2":3"':4"'-trimethoxy benzyl)-4'-piperazinyl]-pyrimidine

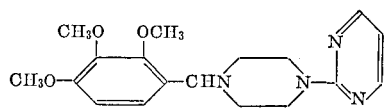

prepared as in Example 1 from 1-(2':3':4'-trimethoxy benzyl)-piperazine and 2-chloro pyrimidine in xylene at reflux. The base melts at 105° C.

EXAMPLE 6

2-[1'-(2''-methoxy phenyl)-4'-piperazinyl]-pyrimidine

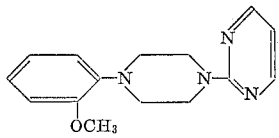

prepared as in Example 1 from 1-(2'-methoxy phenyl)-piperazine and 2-chloro pyrimidine, in xylene at reflux. The base melts at 73° C.

EXAMPLE 7

2-[1'-(3''-methoxy phenyl)-4'-piperazinyl]-pyrimidine

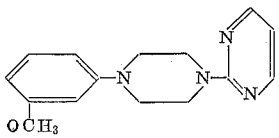

prepared as in Example 1 from 1-(3'-methoxy phenyl)-piperazine and 2-chloro pyrimidine, in xylene at reflux. The base melts at 78° C.

EXAMPLE 8

2-[1'-(4''-methoxy phenyl)-4'-piperazinyl]-pyrimidine

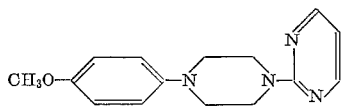

prepared as in Example 1 from 1-(4'-methoxy phenyl)-piperazine and 2-chloro pyrimidine in xylene at reflux. The base melts at 108–110° C.

EXAMPLE 9

2-[1'-(3'':4''-dimethyoxy benzyl)-4'-piperazinyl]-pyrimidine

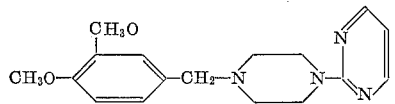

prepared as in Example 1 from 1-(3':4'-dimethoxy benzyl)-piperazine and 2-chloro pyrimidine in xylene at reflux. The base melts at 101° C.

EXAMPLE 10

2-[1'-(2'':4''-dimethoxy benzyl)-4'-piperazinyl]-pyrimidine

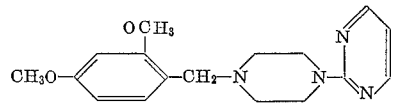

prepared as in Example 2 from 1-(2'-pyrimidyl)-piperazine and (2':4'-dimethoxy)-benzyl chloride in xylene at reflux. The corresponding dihydrochloride melts at 207–215° C. (with decomposition).

EXAMPLE 11

2-[1'-(3'':4''-methylene dioxy benzyl)-3'-methyl-4'-piperazinyl]-pyrimidine

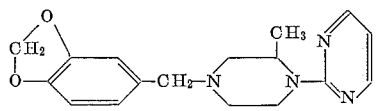

prepared as in Example 2, from 4-(2-pyrimidyl)-3-methyl piperazine boiling at 150–170° C. under 3 mm. of Hg and from 3':4'-methylene dioxy benzyl chloride in dimethyl formamide at 130° C. The corresponding di- hydrochloride melts at 189–197° C. (with decomposition).

EXAMPLE 12

2-[1'-(3'':4''-methylene dioxy benzyl)-2'-methyl-4'-piperazinyl]-pyrimidine

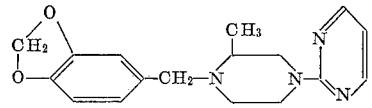

prepared as in Example 1 from 1-(3':4'-methylene dioxy benzyl)-2-methyl piperazine boiling at 150–160° C. under 1 mm. Hg and from 2-chloro pyrimidine in dimethyl formamide at 130° C. The corresponding dihydrochloride melts at 225–228° C. (with decomposition).

EXAMPLE 13

2-[1'-(3'':4''-methylene dioxy benzyl)-4'-piperazinyl]-4-methoxy pyrimidine

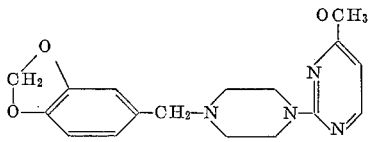

prepared as in Example 1 from 2-chloro 4-methoxy pyrimidine and from 1-(3':4'-methylene dioxy benzyl)-piperazine in dimethyl formamide at 130° C. The base melts at 89–90° C.

EXAMPLE 14

2-[1'-(3'':4''-methylene dioxy benzyl)-4'-piperazinyl]-4-ethoxy pyrimidine

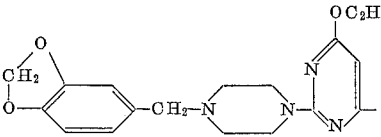

prepared as in Example 1, from 2-chloro-4-ethoxy pyrimidine and from 1-(3':4'-methylene dioxy benzyl)-piperazine in dimethyl formamide at 130° C. The corresponding dihydro chloride melts at 225° C. (instantaneous).

EXAMPLE 15

2-[1'-(3'':4''-methylene dioxy benzyl)-4'-piperazinyl]-4:6-dimethyl pyrimidine

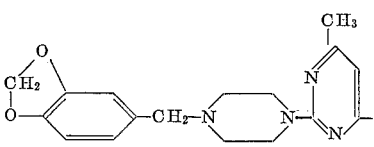

prepared as in Example 1, from 2-chloro-4:6-dimethyl pyrimidine and from 1-(3':4'-methylene dioxy benzyl)-piperazine in dimethyl formamide at 130° C. The corresponding monohydrochloride melts at 256° C. (instantaneous).

EXAMPLE 16

2-[1'-(3'':4''-methylene dioxy benzyl)-4'-piperazinyl]-4:5-dimethyl pyrimidine

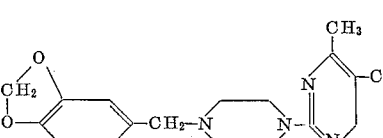

prepared as in Example 1, from 2-chloro 4:5-dimethyl pyrimidine and from 1-(3':4'-methylene dioxy benzl)-piperazine in dimethyl formamide at 130° C. The corresponding monohydrochloride melts at 245° C. (instantaneous).

EXAMPLE 17

*2-[1'-(3":4"-methylene dioxy benzyl)-4'-piperazinyl]-
4-methyl pyrimidine*

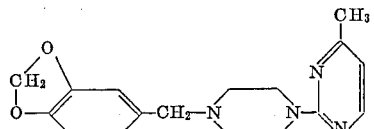

prepared as in Example 1, from 2-chloro-4-methyl pyrimidine and from 1-(3':4'-methylene dioxy benzyl)-piperazine in dimethyl formamide at 130° C. The corresponding dihydrochloride melts at 212–215° C. (with decomposition).

EXAMPLE 18

*2-[1'-(3":4"-methylene dioxy benzyl)-4'-piperazinyl]-
4-amino pyrimidine*

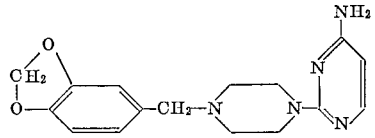

prepared as in Example 1, from 2-chloro-4-amino pyrimidine and from 1-(3':4'-methylene dioxy benzyl)-piperazine in dimethyl formamide at 130° C. The base melts at 169° C.

EXAMPLE 19

*2-[1'-(3":4"-methylene dioxy benzyl)-4'-piperazinyl]-
4-methylamino pyrimidine*

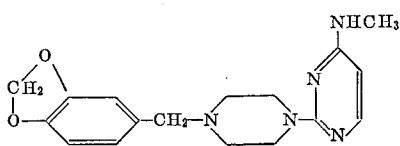

prepared as in Example 1, from 2-chloro-4-methylamino pyrimidine and from 1(3':4'-methylene dioxy benzyl)-piperazine in dimethyl formamide at 130° C. The corresponding bis methane sulfonate melts at 234° C. (instantaneous).

EXAMPLE 20

*2-[1'-(3":4"-methylene dioxy benzyl)-4'-piperazinyl]-
4-dimethylamino pyrimidine*

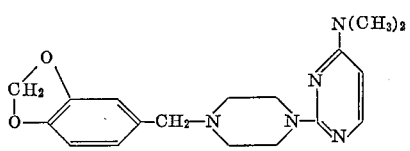

prepared as in Example 1, from 2-chloro-4-dimethylamino pyrimidine and from 1(3':4'-methylene dioxy)-piperazine in dimethyl formamide at 130° C. The base melts at 103° C.

EXAMPLE 21

*Bis 4-amino-(β-hydroxyethyl)-2-[1'-(3":4"-methylene
dioxy benzyl)-4'-piperazinyl]-pyrimidine*

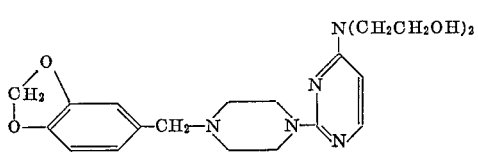

prepared as in Example 1, from bis 2-chloro (β-hydroxy ethyl) 4-amino pyrimidine melting at 110° C. and from 1-(3':4'-methylene dioxy benzyl)-piperazine in dimethyl formamide at 130° C. The corresponding dihydrochloride melts at 216–225° C. (with decomposition).

EXAMPLE 22

*2-[1'-(3':4-methylene dioxy benzyl)-4'-piperazinyl]-
4-hydroxy pyrimidine*

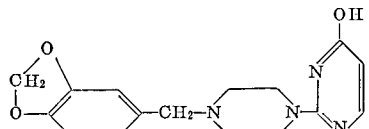

A mixture of 24.7 grams of 2-chloro-4-benzyloxy pyrimidine melting at 80° C. and 22.9 grams of 1-(3':4'-methylene dioxy benzyl)-piperazine, in 200 cm.³ of dimethylformamide in presence of 28.7 grams of potassium carbonate, is heated during 6 hours at 130° C.

When the reaction is completed, the dimethyl formamide is distilled under reduced pressure and the liquid residue poured out in 200 cm.³ of boiling water. The product crystallized by cooling, the crystals are dried and recrystallized in 75 cm.³ is isopropanol. 36.5 grams of 2-[1'-(3':4'-methylene dioxy benzyl) - 4' - piperazinyl]-4-benzyloxy pyrimidine are obtained, melting at 108° C. The crystals are dissolved in 900 cm.³ of anhydrous ethanol and the solution is subjected to a hydrogenation under a pressure of 15 atmospheres of hydrogen pressure at normal temperature, in presence of 9 grams of 10% palladium on carbon. After 5 hours, the theoretical amount of hydrogen being absorbed, the catalyst is filtered and extracted with 100 cm.³ of 10% hydrochloric acid. The ethanolic and acid extracts are mixed and the solution obtained is concentrated under reduced pressure. The residue is redisolved in 75 cm.³ of water and the solution is neutralized by potassium carbonate at pH 7. The crystallized freed base is filtered and recrystallized in 60 cm.³ of dimethyl formamide. 9.85 grams of white crystals are finally obtained melting at 214° C. (instantaneous).

EXAMPLE 23

*2-[1'-(4":hydroxy-3"-methoxy benzyl)-4'-piperazinyl]-
pyrimidine*

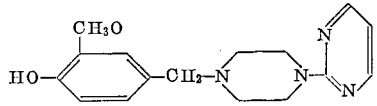

prepared as in Example 1, from 1-(2'-pyrimidyl)-piperazine and from 4-acetoxy-3-methoxy benzyl chloride.

The 2-[1'-(3"-methoxy-4"-acetoxy benzyl)-4'-piperazinyl]-pyrimidine is obtained and subjected to hydrolysis by means of a boiling alcoholic potassium hydroxide solution; an oil base is obtained. The corresponding dihydrochloride melts at 180–188° C. (with decomposition) and crystallized with one molecule of water.

EXAMPLE 24

*2-[1'-(3"-methoxy-4"-hydroxy benzyl)-4'-piperazinyl]-
pyrimidine*

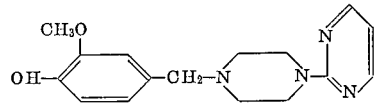

10 grams of vanillin and 7.19 grams of 1-(2'-pyrimidyl) piperazine are dissolved in 200 cm.³ of ethanol and the solution obtained is subjected to hydrogenation under 4 atmospheres of hydrogen pressure, in the presence of 2 grams of 10% palladium on carbon, at a temperature of 70° C. After 2½ hours the theoretical amount of hydrogen is absorbed. The catalyst is filtered and the filtrate concentrated under reduced pressure. The residue obtained is dissolved in 50 cm.³ of ether and the etheric solution extracted several times wtih hydrochloric acid at 20%. The acid extracts are combined, then washed with ether, alkalinized with potassium carbonate and extracted several times with chloroform. After drying and evaporation of chloroform, 14 grams of yellow oil are obtained.

By addition of hydrochloric ether to the ethanolic solution of this compound, and recrystallisation of the crystals obtained in the methanol, 9 grams of white crystals melting at 180–188° C. (with decomposition), which crystallized with one molecule of water are finally obtained.

EXAMPLE 25

2-[1'-(3":4"-dihydroxy benzyl)-4'-piperazinyl]-pyrimidine

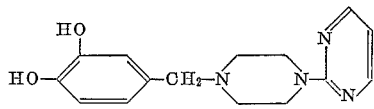

prepared as in Example 22, from protocatechuic aldehyde and from 1(2'-pyrimidyl) piperazine. The corresponding dihydrochloride melts at 207–212° C. (with decomposition) and crystallized with one molecule of water.

Where the foregoing examples produce a compound having a methyl or other lower-alkyl group, it is to be understood that compounds containing other lower-alkyl groups of straight or branched nature and containing up to five carbon atoms inclusive, such as methyl, ethyl, propyl, isopropyl, butyl, sec.-butyl, t.-butyl, amyl and isoamyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to five carbon atoms inclusive are prepared in the same manner from the appropriate different lower-alkoxy sttarting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta products are produced instead of the para by utilizing the selected ortho or meta substituted starting material and vice versa. Similarly, other molecular changes within the scope of the invention are readily made.

It is to be understood that the invention is not to be limited to the exact details of operation or exact compounds, compositions or procedures shown and described, as obvious modifications and equivalents will be apparent to one skilled in the art, and the invention is therefore to be limited only by the scope of the appended claims.

What we claim is:
1. A compound selected from the group consisting of (A) new pyrimidines of the formula

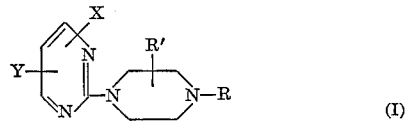

in which:
(a) R is selected from the group consisting of
(1) benzyl of the formula

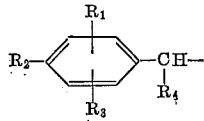

in which $R_1$, $R_2$ and $R_3$ are each individually selected from the group consisting of hydrogen, hydroxyl, lower-alkoxy having up to 5 carbon atoms inclusive, and lower-alkanoyloxy, and further members of the group wherein any two of $R_1$, $R_2$ and $R_3$ in ortho position to each other together represent an alkylene dioxy chain, —O—$(CH_2)_n$—O—, in which $n$ is selected from the integers 1 and 2, and $R_4$ is selected from the group consisting of hydrogen, lower-alkyl having up to 5 carbon atoms inclusive, and phenyl having substituents selected from the group consisting of $R_1$, $R_2$ and $R_3$ as defined above; and (2) phenyl selected from 2-, 3- and 4-mono-substituted phenyl and 2:3, 3:4 and 2:5 disubstituted phenyl, the substituents being selected from the group consisting of halogen, lower-alkyl having up to 5 carbon atoms inclusive, lower-alkoxy having up to 5 carbon atoms inclusive, trifluoromethyl ($CF_3$), and hydroxyl;

(b) R' is selected from the group consisting of hydrogen and methyl; and (c) X and Y are each individually selected from the group consisting of hydrogen, lower-alkyl having up to 5 carbon atoms inclusive, lower-alkoxy having up to 5 carbon atoms inclusive, hydroxyl, and amino-R"R'" in which R" and R'" are each individually selected from the group consisting of hydrogen lower-alkyl having up to 5 carbon atoms inclusive, provided that, when X and Y are selected from hydrogen and lower-alkyl, then R is selected from alkylenedioxybenzyl, hydroxymethoxybenzyl, dimethoxybenzyl, trimethoxybenzyl, and benzhydryl, and hydroxy-lower-alkyl; and (B) pharmaceutically acceptable acid addtion salts thereof.

2. 2-[1'-(3":4"-methylene dioxy benzyl)-4'-piperazinyl]-pyrimidine.

3. 2-[1'-(3":4"-ethylenedioxy benzyl) - 4' - piperazinyl]-pyrimidine.

4. 2-[1'-(3":4"-dimethoxy benzyl) - 4' - piperazinyl]-pyrimidine.

5. 2-[1'-(3":4"-methylenedioxy benzyl)-2'-methyl-4'-piperazinyl]-pyrimidine.

6. 2-[1'-(3":4" - methylenedioxy benzyl)-4'-piperazinyl]-4:5-dimethyl pyrimidine.

7. 2-[1'-(3":4" - methylenedioxy benzyl)-4'-piperazinyl]-4-amino pyrimidine.

8. 2-[1'-(3":4" - methylenedioxy benzyl)-4'-piperazinyl]-4-hydroxy pyrimidine.

9. 2-[1'-(4"-hydroxy-3"-methoxy benzyl) - 4' - piperazinyl]-pyrimidine.

References Cited by the Examiner
UNITED STATES PATENTS

| | | | |
|---|---|---|---|
| 2,543,972 | 3/1951 | Hultquist et al. | 260—256.4 |
| 2,562,036 | 7/1951 | Hultquist et al. | 260—256.4 |
| 2,663,706 | 12/1953 | Conroy | 260—256.4 |
| 2,979,508 | 4/1961 | Janssen | 260—256.4 X |
| 2,985,657 | 5/1961 | Janssen | 260—256.4 |
| 3,078,214 | 2/1963 | Hofmann et al. | 260—319 X |
| 3,086,911 | 4/1963 | Brown et al. | 167—65 |
| 3,141,820 | 7/1964 | Clark et al. | 260—256.4 X |
| 3,144,387 | 8/1964 | Jones | 167—65 |

ALEX MAZEL, *Primary Examiner.*

MARY U. O'BRIEN, *Assistant Examiner.*